United States Patent
Algiene et al.

(10) Patent No.: US 8,027,916 B2
(45) Date of Patent: Sep. 27, 2011

(54) METHOD AND APPARATUS FOR SCREENING FINANCIAL TRANSACTIONS

(75) Inventors: Kenneth Algiene, Littleton, CO (US); Henry M. Abelman, Roswell, GA (US); Joseph Cachey, III, Denver, CO (US)

(73) Assignee: The Western Union Company, Englewood, CO (US)

( * ) Notice: Subject to any disclaimer, the term of this patent is extended or adjusted under 35 U.S.C. 154(b) by 3308 days.

(21) Appl. No.: 10/322,311

(22) Filed: Dec. 17, 2002

(65) Prior Publication Data

US 2004/0117299 A1 Jun. 17, 2004

(51) Int. Cl.
*G06Q 40/00* (2006.01)
(52) U.S. Cl. .......................................................... 705/39
(58) Field of Classification Search .................... 705/35, 705/36 R, 36 T, 37, 38, 39
See application file for complete search history.

(56) References Cited

U.S. PATENT DOCUMENTS

| | | | | |
|---|---|---|---|---|
| 5,704,045 A | * | 12/1997 | King et al. ........................ | 705/35 |
| 6,311,170 B1 | * | 10/2001 | Embrey ........................... | 705/40 |
| 2002/0029194 A1 | * | 3/2002 | Lewis et al. ..................... | 705/39 |
| 2002/0082961 A1 | * | 6/2002 | Abrahm et al. ................. | 705/35 |
| 2002/0091635 A1 | * | 7/2002 | Dilip et al. ....................... | 705/39 |
| 2002/0152160 A1 | * | 10/2002 | Allen-Rouman et al. ...... | 705/39 |

* cited by examiner

*Primary Examiner* — Olabode Akintola
*Assistant Examiner* — Muriel Tinkler
(74) *Attorney, Agent, or Firm* — Kilpatrick Townsend & Stockton LLP

(57) ABSTRACT

A system for screening money transfers. According to one embodiment of the invention an operator is provided with at least one prompt to request further information about an attempted money transfer. The operator can be prompted with a series of questions to facilitate a regimented screening process of suspicious transfers.

31 Claims, 7 Drawing Sheets

FIG. 4      400

METHOD AND APPARATUS FOR SCREENING FINANCIAL TRANSACTIONS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

This invention relates generally to the screening of financial transactions. More particularly, embodiments of this invention relate to screening suspicious transfers of money.

BACKGROUND

Money transfer locations provide users with the ability to transfer money to another party in another part of the world. For example, parents can transfer money to their child at college during emergency situations. Similarly, a user faced with a late payment of a bill can wire or transfer funds to their credit card company so as to avoid a late fee. These are but a few examples of money transfers that take place.

These transfers can be conducted in person at a money transfer location or via a network connection. For example, a user might go to a Western Union location and conduct a transfer of money to a receiving party at a location in another state or country. Alternatively, a user might use a website such as Western Union to conduct a transfer of funds to the receiving party. Furthermore, one might even use a touch tone telephone system to provide banking information and account information to route funds to the receiving party. Thus, a variety of mechanisms can be used to initiate the money transfer. The money transfer service can then facilitate the transfer of funds to the receiving party through its own transfer network. Thus, a user who places a money transfer request with the money transfer service can rely on the money transfer service to convey the transferred funds to the receiving party and generate a confirmation that the transfer has taken place. All this can take place without the use of the banking networks. Thus, the fees associated with bank transfers can be avoided to the customer's advantage.

With the convenience of these money transfers, also comes the associated problem that disreputable people will try to misuse the system. For example, criminals might try to use the system to launder money. Similarly, terrorist organizations might try to use the system to convey funds to operatives in distant locations without traceability. These and other potential criminal or fraudulent activities exist just as they exist with normal banking channels.

Thus, there is a need for a system that can facilitate the detection of improper money transfers. Furthermore, there is a need for a system that will allow the management of a money transfer service to be alerted to potential misconduct by the transferring parties.

SUMMARY OF THE INVENTION

One embodiment of the invention provides a method of monitoring an attempted money transfer through a money transfer service. This method can be implemented by receiving from a user a request to transfer an amount of money to a receiving party; obtaining data from a database for at least one previously requested transfer by that user; utilizing this data to determine whether this request to transfer the amount of money violates a screening condition of the money transfer service; and, in response to a positive determination that the request to transfer the amount of money violates the screening condition, automatically prompting the operator of the money transfer service to request further information from the user. The operator can be conveyed a question or a series of questions to ask the user about the request to transfer the money.

Furthermore, according to another embodiment of the invention, a software product can be provided for use by a money transfer service to facilitate the method outlined above.

According to various aspects of the invention, a series of questions can be provided to an operator, in which the operator can inquire of the user the specific details surrounding the money transfer. For example, the operator can inquire of the user whether the user has supporting documentation to authenticate the need to transfer the designated amount. Similarly, the operator could request the user to provide further identifying information, such as an invoice that reflects the amount of money being transferred. In addition, the operator can be prompted to contact the receiving party so as to determine whether the receiving party is a legitimate receiving party.

DETAILED DESCRIPTION

Figure 1:
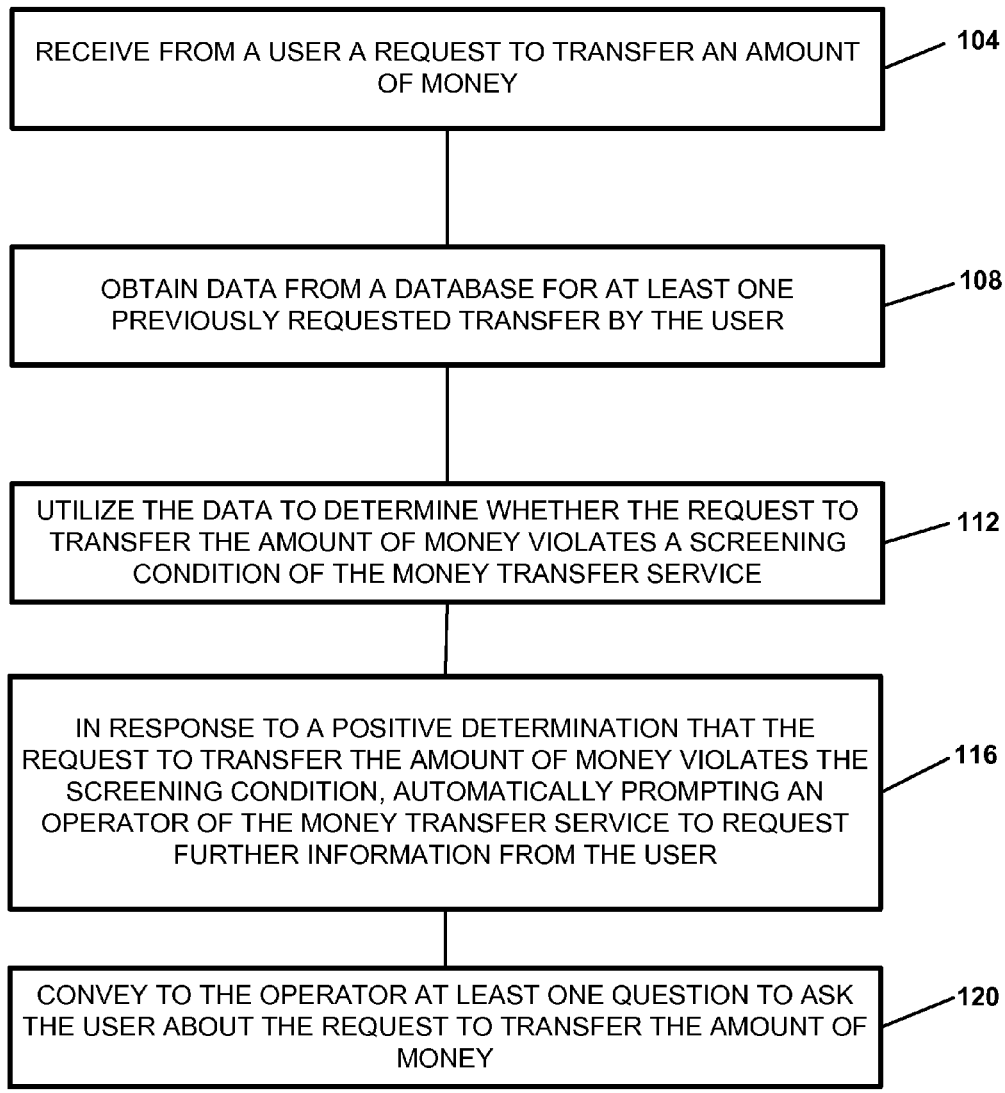
FIG. 1 illustrates a flowchart demonstrating a method of implementing a screening process, according to one embodiment of the invention.

The present embodiments of the invention provide a system that facilitates the screening of money transfers. According to one embodiment of the invention, suspicious transfers can be screened and identified for further checking by the money transfer service. Thus, an automated procedure can be implemented to invoke the intervention by a human operator for further screening of an attempted transaction. In this way, the vast majority of attempted money transfers that are legitimate can be processed while those that are fraudulent or illegal in some other manner can be more readily detected. Furthermore, it also facilitates an efficient use of human operators to interact with those transactions that are more likely to be fraudulent.

Generally, money transfers are accomplished either in person or via a network system, such as the internet or public service telephone network (PSTN). For example, Western Union provides a series of service centers throughout the United States as well as the world where users can enter the facility and place a request to transfer funds to a receiving party at another locale somewhere in the world. This vast network of service centers is widely used by users who want to transfer funds to their receiving party immediately rather than waiting for a check to be sent through the mail system. Similarly, some banks charge a large fee for transferring money from the user's account to the receiving party's account. In addition, the receiving party may not have a bank account to receive funds. Furthermore, the service centers can have extended hours that allow a receiving party to obtain the funds after normal banking hours or even on weekends. Thus, the common example where money transfer services are utilized is a parent transferring an amount of money to his or her child in a distant state. In such a situation, the child might not have a bank account, but will be in need of immediately receiving the funds. Thus, the money transfer service greatly facilitates such an immediate transfer.

Some criminal activity has been detected in the past of criminals using the money transfer services. For example, some criminal organizations will use money transfer services to transfer money to their operatives in distant states. Similarly, the money transfer service can be used to transfer funds and thus launder cash received through criminal activity. More alarming, is the potential use of money transfer services by terrorist organizations to transfer money from foreign countries to operatives in the United States. These transactions can be conducted with cash as opposed to the banking system which has account numbers. Thus, there is less likelihood of identifying terrorists through such money transfers.

In an attempt to prevent such criminal activity from occurring, money transfer services have implemented a variety of rules to prevent abuse of the system. For example, a cumulative amount for transfers has been implemented to screen users who might be abusing the system. Thus, for example, if a user conducts multiple transactions above a predetermined maximum number of transactions within a given period of time, the system will identify the user as potentially engaging in suspicious activity. Similarly, if the user attempts to transfer an excessive amount of money through the money transfer service in one or more transactions, the user will be identified as potentially engaging in suspicious activity.

Thus, according to one embodiment of the invention, a system is provided to facilitate the screening of users who are suspected of abusing the money transfer service. FIG. 1 illustrates an exemplary method of implementing such a system. According to the flowchart 100 of FIG. 1, a money transfer system receives a request from a user to transfer an amount of money, as shown in block 104. This request to transfer an amount of money can be received via an in-store request at one of the money transfer service locations or via a network request from the user interacting with the money transfer service on-line or via a telephone network. Thus, there are a variety of ways in which the user can initiate the money transfer request. In block 108, a money transfer service database will obtain data for at least one previously requested transfer by the user. This data can be utilized as shown in block 112 to determine whether the request to transfer the amount of money violates a screening condition of the money transfer service. Block 116 illustrates that in response to a positive determination that the request to transfer the amount of money violates a predetermined screening condition, an operator is automatically prompted to request further information from the user about the transfer request. Finally, block 120 of FIG. 1 shows that the operator is then prompted with at least one question to ask the user about the request to transfer the amount of money.

Figure 2A:
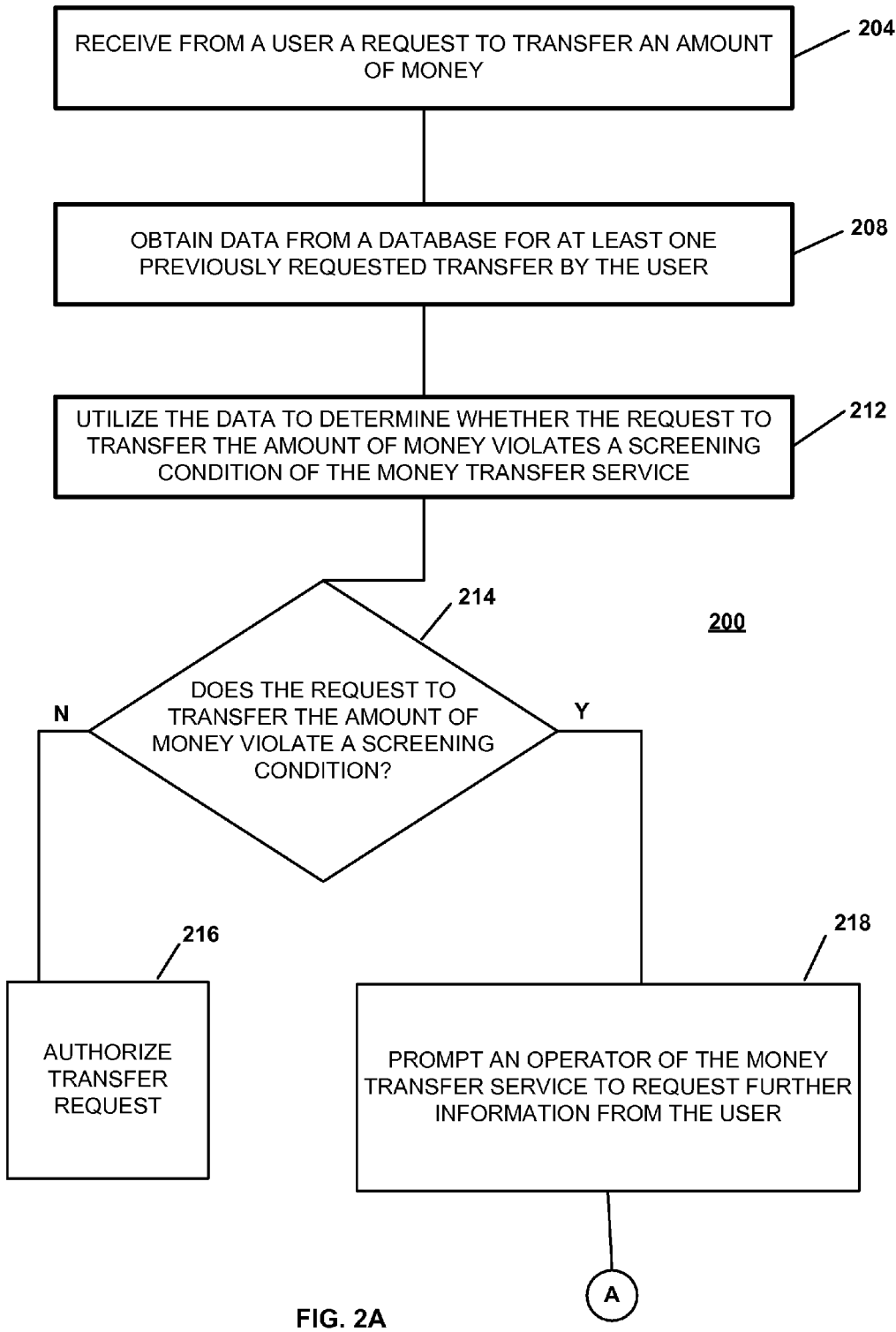
FIGS. 2a and 2b illustrate flowcharts for a method of routing a suspicious transaction to an operator for conducting further screening of the transfer, according to one embodiment of the invention.
Figure 2B:
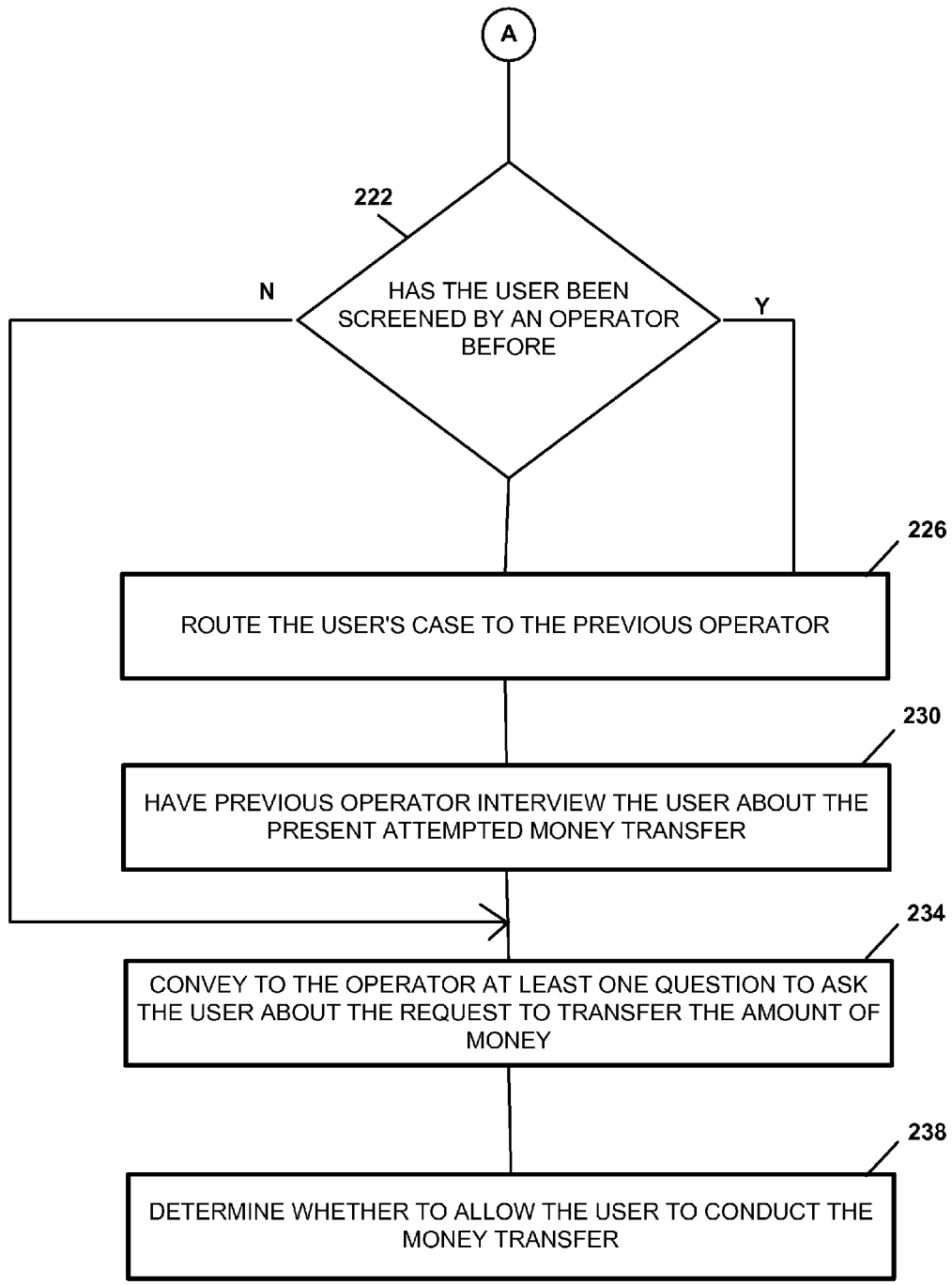

FIGS. 2a and 2b illustrate another embodiment of the invention in more detail, according to flowchart 200. In FIG. 2a, a user requests to transfer an amount of money as illustrated in block 204. In block 208, data is obtained from a database for at least one previously requested transfer by the user. This data is utilized to determine whether the request to transfer the amount of money violates the screening condition established by the money transfer service as shown in block 212. In block 214, a determination is made as to whether the request to transfer the amount of money violates the screening condition. If the request does not violate the screening condition, block 216 shows that the transfer request is authorized. Thus, the transfer service can proceed with additional details of the transfer request, such as confirming the presence of the amount of funds being transferred. However, if the screening condition is violated, an operator of the money transfer service is prompted to request further information from the user as shown in block 218.

Figure 4:
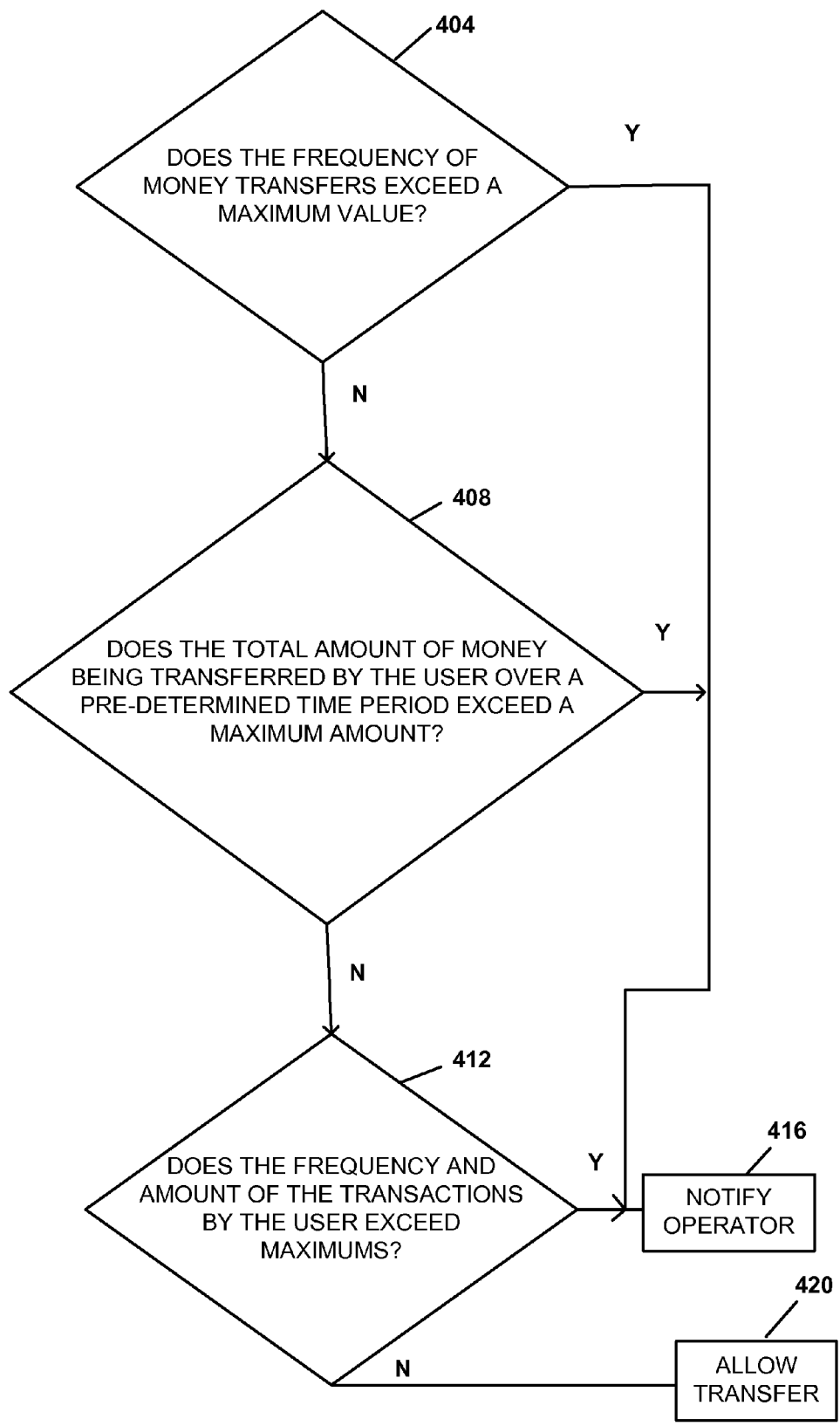
FIG. 4 illustrates a flowchart demonstrating a method of screening a money transfer, according one embodiment of the invention.

FIG. 4 illustrates examples of conditions used to screen attempted money transfers. In flowchart 400 of FIG. 4, an exemplary scenario is illustrated for detecting potential violations of the money transfer service rules. In block 404, a determination is made as to whether the frequency of money transfers by a user exceeds a maximum value. For example, by obtaining previous transfer requests of the user from the database of previously attempted transfers, a determination is made of the frequency of transactions by the user. The more often the user utilizes the transfer service, the greater the likelihood that the user is engaging in criminal activity. Thus, frequency can serve as one screening mechanism. If the frequency does not exceed a pre-established value, a second check can be made as to whether the total amount of money being transferred by the user over a predetermined time period exceeds a maximum amount as shown in block 408. This predetermined time period can be limited to an individual transaction or it can be stretched out over a longer period of time. Thus, by determining the aggregate amount of money being transferred during this predetermined time period, this money transfer service can determine whether an excessive amount of money is being transferred by the user. Furthermore, this can also be a useful test even when the user is spreading the transfers to a variety of recipients. Again, if this determination is negative, an additional check can be made as shown in block 412. Block 412 shows that the frequency and the amount of the transactions by the user can be screened to determine whether they exceed maximum amounts. Thus, this serves as yet another screening mechanism to determine if potentially suspicious transfers are being conducted. If any of these exemplary conditions is satisfied, then block 416 shows that an operator is notified for further screening of the transaction. However, if the screening conditions are not satisfied, the transfer process is allowed to proceed as shown in block 420. The conditions are merely examples. Other conditions could also be implemented, as would be understood by one of ordinary skill in the art.

Returning to flowchart 200 in FIG. 2b, once the determination has been made that the transaction requires further screening by a human operator, a second check can be made to determine whether the user has been screened by an operator before. This is shown in block 222. If a user has been screened before, the user's case is routed to that previous operator as illustrated in block 226. Thus, as shown in block 230, this previous operator can interview the user about the present attempted money transfer. In this way, a user who has previously been identified as conducting suspicious transactions will be screened by the same operator who previously screened those suspicious transactions. This provides another layer of security in that the user will be less likely to mislead the operator if the operator has a history of dealing with the user. For example, if a user fabricates a story that an excessive amount of money is being transferred to pay tuition for a student in a distant country, a second attempt with the same fabricated story will be very suspicious to an operator who handles both screenings. Furthermore, just the familiarity of the operator with a user will be beneficial to the screening process as well as the public relations aspect of dealing with customers.

If a previous operator is determined to exist, the user's case is routed to the previous operator as shown in block 226. The previous operator is then prompted to interview the user about the present attempted money transfer as shown in block 230. If no previous history with a particular operator exists, flowchart 200 shows that the user's case is routed to an available operator. Once the user's case is deposited with an operator, flowchart 200 shows in block 234 that questions can be conveyed to the operator to inquire with the user about the suspicious money transfer request. This is illustrated further in flowchart 300 of FIG. 3.

Figure 3:
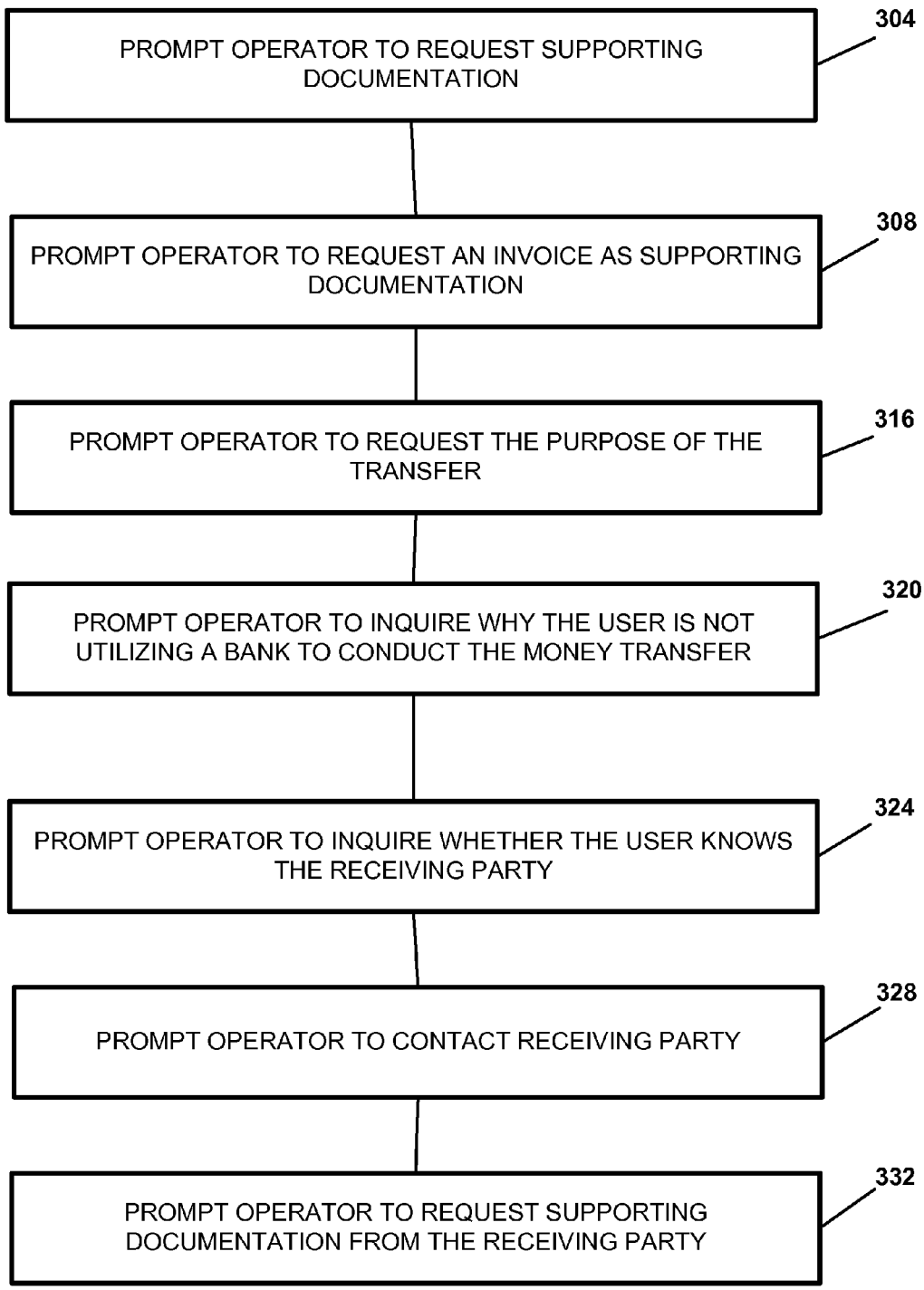
FIG. 3 illustrates a series of exemplary questions that can be utilized to prompt an operator who is screening a money transfer, according to one embodiment of the invention.

FIG. 3 illustrates a method 300 which can be implemented to prompt an operator with a variety of questions or requests for further information. For example, block 304 shows that the operator can be prompted to request supporting documentation from the user. Block 308 shows that the operator can be prompted to request an invoice as the supporting documentation. Thus, if the user identifies the money transfer as relating to payment for a product, the program can be coded so as to request the invoice for the product. As another prompt, block 316 shows that the operator can be asked to request the purpose of the transfer. Thus, a user who provides a plainly fictitious purpose can be denied permission to conduct the transfer. Similarly, block 320 shows that the operator can be prompted to inquire why the user is not utilizing a bank to conduct the money transfer. Such a question is useful when a large amount of money is being transferred which normally would be transferred through the bank network system. Transfers of large amounts of money historically have been conducted by banks. Therefore, a user transferring such a large amount of money without using a banking network is suspicious. In addition, the operator can be prompted to make an inquiry with the receiving party. Thus, the operator can be prompted to inquire whether the user knows the receiving party as shown in block 324 or whether the receiving party knows the user. The receiving party can similarly be contacted by the operator as shown in block 328 to determine whether the receiving party knows the user. Finally, the flowchart 300 shows that the operator can be prompted to request supporting documentation from the receiving party. Thus, if the user does not have the supporting documentation, for example, the receiving party can be asked to supply such documentation.

Returning to FIG. 2, the flowchart 200 illustrates that after the screening process is conducted by the operator that a determination is made as to whether to allow the user to conduct the money transfer. This is illustrated in block 238. Thus, the operator can be given final discretion in determining whether the user should be allowed to continue with the transfer request. However, the prompting of the operator with predetermined questions allows a more rigorous and consistent approach to be implemented in the screening process. Therefore, while the ultimate decision can be left to an operator, the screening conditions and/or questions can be predetermined for implementation by the operator. This is more beneficial than systems which leave the determination to the discretion of the operator without any prompting. Namely, such a system can be highly inconsistent depending on which operator reviews the case. By prompting an operator with a series of questions or a computerized selection of follow-up questions based upon answers given to initial questions, the screening process can be highly regimented.

Figure 6:
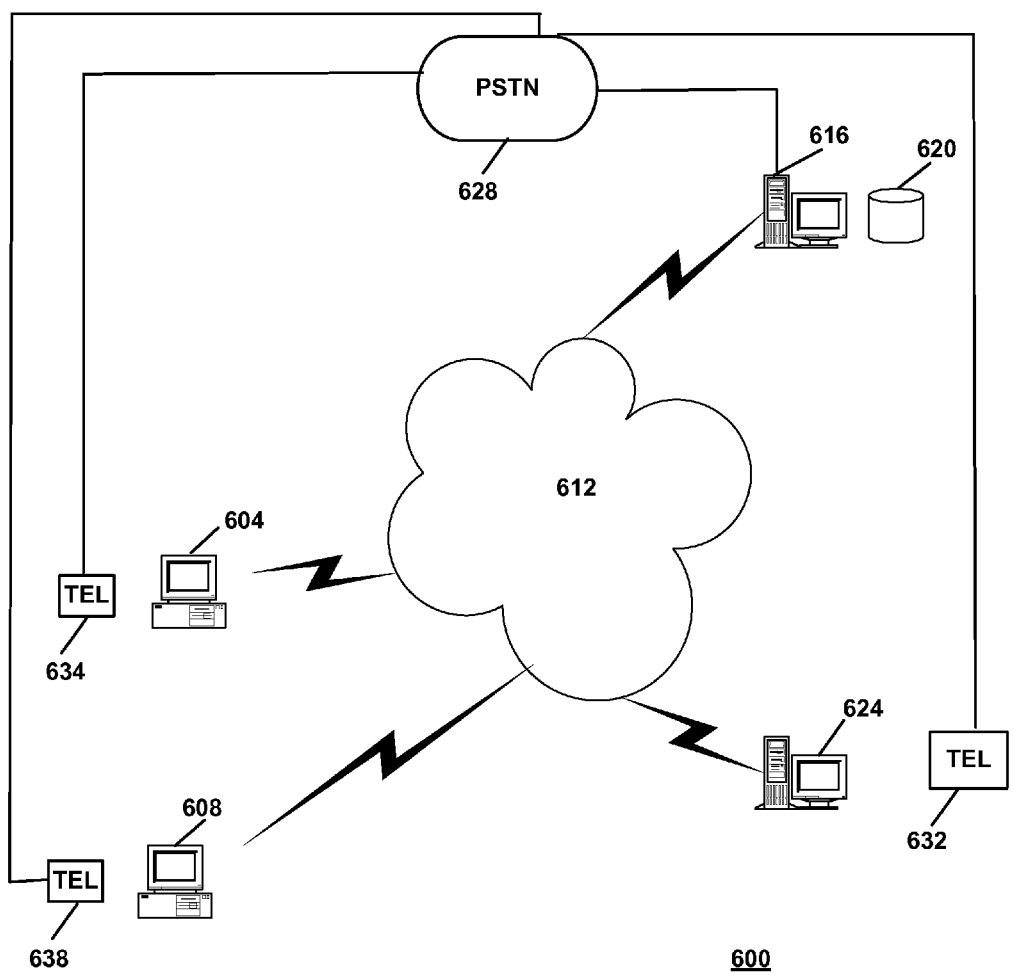
FIG. 6 illustrates a network system for screening money transfers, according to one embodiment of the invention.

FIG. 6 illustrates an example of implementing a screening service according to another embodiment of the invention. In system 600 a transaction is conducted via a computer network. A user operating computer 604 conveys a request for transferring funds to a receiving party at computer 608 via network 612. One example of such a network is the internet. According to FIG. 6, the request is received at a website supported by server 616 coupled to database 620. The server 616 supports a website that allows the user to enter data identifying the amount of funds to be transferred and the name of the receiving party. Upon receiving the entered information, the server compares the data for the transaction to records stored in database 620 (as explained previously). Furthermore, server 616 can conduct the screening process based upon the particulars of the requested transaction as well as based upon prior transactions. Upon identifying the transaction as being a suspicious transaction, server 616 routes the case to operator 624. Operator 624 can be an operator who previously interacted with the user, or if no such history exists, the available operator at that time. Operator 624 can then use the public service telephone network 628 to interview the user 604 through handsets 632 and 634. This could be conducted in a variety of ways. For example, the operator might initiate the telephone conversation upon receiving notice that the transaction is suspicious. Or, the operator might request that the user contact the operator by telephoning the operator. Similarly, the operator can telephone the receiving party 608 having handset 638 to request further information or documentation.

While FIG. 6 illustrates the internet and telephone based system for conducting and screening a transfer request, a similar system could be implemented where the user attempts to transfer the funds from a physical money transfer service location. Thus, if a user walks into a Western Union Service Center and makes a suspicious transfer request, a terminal at the service counter can be used to prompt the operator conducting the transaction. Alternatively, an operator at a remote service call center could be prompted to telephone the user at the service center location. Thus, according to this embodiment of the invention an operator can be placed in contact with the user and prompted with questions to request further information for the screening process.

Figure 5:
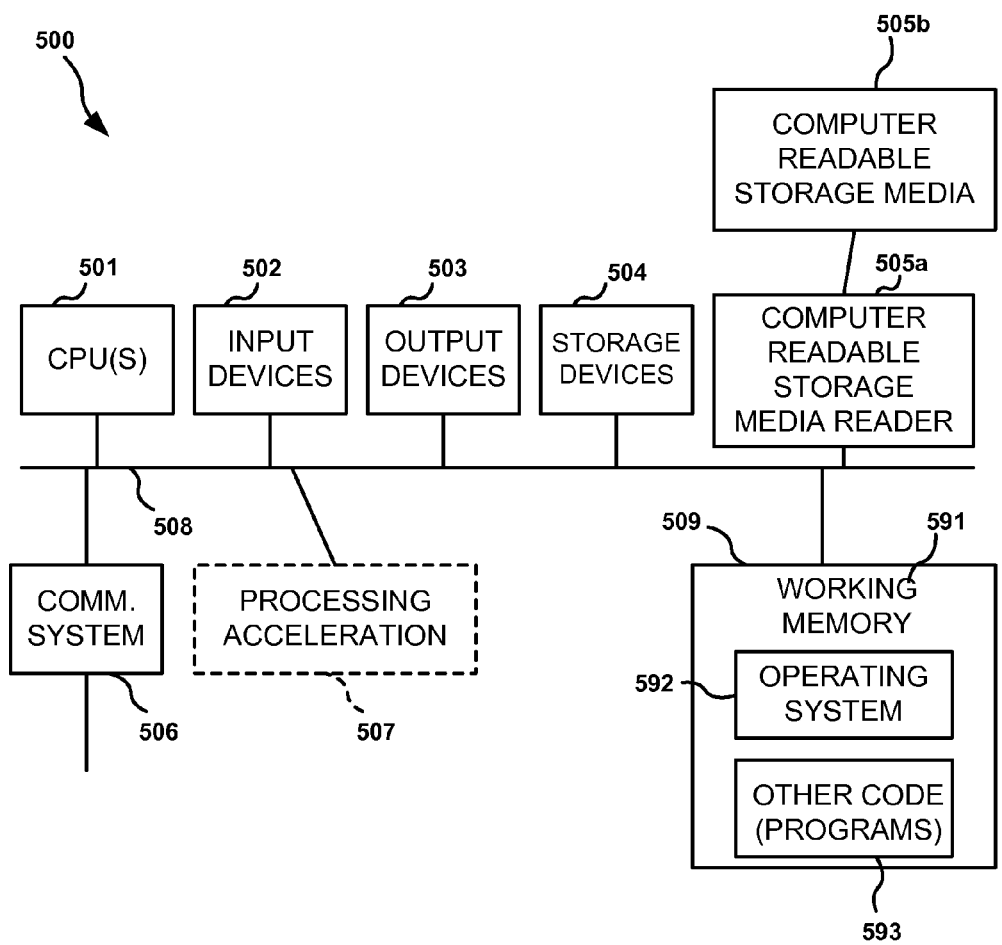
FIG. 5 illustrates a block diagram of the hardware which can be used to by an operator in screening a suspect money transfer, according to one embodiment of the invention.

FIG. 5 illustrates a block diagram of a typical computing device which can be utilized by the computing devices in FIG. 6. System 500 is shown comprised of hardware elements that are electrically coupled via bus 508, including a processor 501, input device 502, output device 503, storage device 504, computer-readable storage media reader 505a, communications system 506 processing acceleration (e.g., DSP or special-purpose processors) 507 and memory 509. Computer-readable storage media reader 505a is further connected to computer-readable storage media 505b, the combination comprehensively representing remote, local, fixed and/or removable storage devices plus storage media, memory, etc. for temporarily and/or more permanently containing computer-readable information, which can include storage device 504, memory 509 and/or any other such accessible system 500 resource. System 500 also comprises software elements (shown as being currently located within working memory 591) including an operating system 592 and other code 593, such as programs, applets, data and the like.

System 500 offers extensive flexibility and configurability. Thus, for example, a single architecture might be utilized to implement one or more servers that can be further configured in accordance with currently desirable protocols, protocol variations, extensions, etc. However, it will be apparent to those skilled in the art that substantial variations may well be utilized in accordance with more specific application requirements. Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) and certainly not all system 500 components will be required in all cases.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and many of its attendant advantages will be understood from this specification and it will be apparent that various changes may be made in the form, construction, and arrangement of the parts thereof without departing from the spirit and scope of the invention or sacrificing all of its material advantages, the form herein before described being merely exemplary embodiments thereof

What is claimed is:

1. A non-transitory computer-readable medium for monitoring an attempted money transfer through a money transfer service, having sets of instructions stored thereon which, when executed by a computer, cause the computer to:
   receive from a user a request to transfer an amount of money to a receiving party;
   obtain data from a database for at least one previously requested transfer by said user; and
   utilize said data to determine whether said request to transfer said amount of money violates a screening condition of said money transfer service, wherein said screening condition is capable of facilitating the detection of improper money transfers.

2. The non-transitory computer-readable medium as described in claim 1 and further comprising:
   in response to a positive determination that said request to transfer said amount of money violates said screening condition, automatically prompting an operator of said money transfer service to request further information from said user; and
   conveying to said operator at least one question to ask said user about said request to transfer said amount of money.

3. The non-transitory computer-readable medium as described in claim 2, wherein said screening condition comprises assessing the frequency of attempted money transfers involving said user.

4. The non-transitory computer-readable medium as described in claim 2, wherein said screening condition comprises assessing the amounts of attempted money transfers involving said user.

5. The non-transitory computer-readable medium as described in claim 2, wherein said screening condition comprises assessing the frequency of attempted money transfers involving said user and assessing the amounts of attempted money transfers involving said user.

6. A non-transitory computer-readable medium for monitoring an attempted money transfer through a money transfer service, having sets of instructions stored thereon which, when executed by a computer, cause the computer to:
   receive from a user a request to transfer an amount of money to a receiving party;
   obtain data from a database for at least one previously requested transfer by said user;
   utilize said data to determine whether said request to transfer said amount of money violates a screening condition of said money transfer service, wherein said screening condition is capable of facilitating the detection of improper money transfers; and
   make an in-person inquiry with said user by said operator.

7. The non-transitory computer-readable medium as described in claim 6, wherein said in-person inquiry is via a telephone.

8. The non-transitory computer-readable medium as described in claim 6, wherein said in-person inquiry requires said user to be in the physical presence of said operator.

9. The non-transitory computer-readable medium as described in claim 2 wherein said request to transfer money is made via the internet.

10. The non-transitory computer-readable medium as described in claim 2 wherein said request to transfer money is submitted by said user at a money transfer service location.

11. The non-transitory computer-readable medium as described in claim 2 wherein said request to transfer money is submitted by said user via a telephone.

12. The non-transitory computer-readable medium as described in claim 2 wherein said conveying to said operator at least one question to ask said user comprises prompting said operator with said question on a display of the operator.

13. The non-transitory computer-readable medium as described in claim 2 wherein said conveying to said operator at least one question to ask said user comprises prompting said operator to request supporting documentation indicating a legal purpose for the money transfer.

14. The non-transitory computer-readable medium as described in claim 2 wherein said supporting documentation comprises an invoice.

15. The non-transitory computer-readable medium as described in claim 2 and further comprising:
   requesting further information from the receiving party for use in determining whether the money transfer is for a legal purpose.

16. The non-transitory computer-readable medium as described in claim 15 wherein said requesting further information from the receiving party comprises:
   requesting supporting documentation from the receiving party.

17. The non-transitory computer-readable medium as described in claim 2 wherein said conveying to said operator at least one question to ask said user comprises:
   requesting the purpose of the transfer.

18. The non-transitory computer-readable medium as described in claim 2 wherein said conveying to said operator at least one question to ask said user comprises inquiring why said user is not using a bank to accomplish the money transfer.

19. The non-transitory computer-readable medium as described in claim 2 wherein said conveying to said operator at least one question to ask said user comprises inquiring whether the user knows the receiving party.

20. The non-transitory computer-readable medium as described in claim 2 and further comprising:
   determining a previous operator who checked on a previous transaction by said user;
   having the previous operator inquire with the user about the present attempted money transfer.

21. An article of manufacture comprising:
   a computer usable medium having computer readable program code embodied therein for causing a computer to monitor an attempted money transfer by a user, the computer readable program code in said article of manufacture comprising:
      computer readable program code for causing said computer to effect obtaining data from a database for at least one previously requested transfer by said user;
      computer readable program code for causing said computer to effect utilizing said data to determine whether said request to transfer said amount of money violates a screening condition of said money transfer service, wherein said screening condition is capable of facilitating the detection of improper money transfers;
      computer readable program code for causing said computer to effect, in response to a positive determination that said request to transfer said amount of money violates said screening condition, automatically prompting an operator of said money transfer service to request further information from said user;
      computer readable program code for causing said computer to effect conveying to said operator at least one question to ask said user about said request to transfer said amount of money.

22. The article of manufacture as described in claim 21, wherein said computer readable program code for causing said computer to effect utilizing said data to determine whether said request to transfer said amount of money violates said screening condition of said money transfer service comprises:
   computer readable program code for assessing the frequency of attempted money transfers involving said user.

23. The article of manufacture as described in claim 21, wherein said computer readable program code for causing said computer to effect utilizing said data to determine whether said request to transfer said amount of money violates said screening condition of said money transfer service comprises:
   computer readable program code for assessing the amounts of attempted money transfers involving said user.

24. The article of manufacture as described in claim 21 wherein said computer readable program code for causing said computer to effect conveying to said operator said at least one question to ask said user about said request to transfer said amount of money comprises:
   computer readable program code for prompting said operator with said question on a display of the operator.

25. The article of manufacture as described in claim 21 wherein said computer readable program code for causing said computer to effect conveying to said operator said at least one question to ask said user about said request to transfer said amount of money comprises:
   computer readable program code for prompting said operator to request supporting documentation indicating a legal purpose for the money transfer.

26. The article of manufacture as described in claim 21 and further comprising:
   computer readable program code for requesting further information from the receiving party for use in determining whether the money transfer is for a legal purpose.

27. The article of manufacture as described in claim 26 wherein said computer readable program code for requesting further information from the receiving party comprises:
   computer readable program code for requesting supporting documentation from the receiving party.

28. The article of manufacture as described in claim 21 wherein said computer readable program code for causing said computer to effect conveying to said operator said at least one question to ask said user about said request to transfer said amount of money comprises:
   computer readable program code for requesting the purpose of the transfer.

29. The article of manufacture as described in claim 21 wherein said computer readable program code for causing said computer to effect conveying to said operator said at least one question to ask said user about said request to transfer said amount of money comprises:
   computer readable program code for inquiring why said user is not using a bank to accomplish the money transfer.

30. The article of manufacture as described in claim 21 wherein said computer readable program code for causing said computer to effect conveying to said operator said at least one question to ask said user about said request to transfer said amount of money comprises:
   computer readable program code for inquiring whether the user knows the receiving party.

31. The article of manufacture as described in claim 21 and further comprising:
   computer readable program code for determining a previous operator who checked on a previous transaction by said user;
   computer readable program code for having the previous operator inquire with the user about the present attempted money transfer.

* * * * *

(12) EX PARTE REEXAMINATION CERTIFICATE (9472nd)
United States Patent
Algiene et al.

(10) Number: US 8,027,916 C1
(45) Certificate Issued: Jan. 10, 2013

(54) METHOD AND APPARATUS FOR SCREENING FINANCIAL TRANSACTIONS

(75) Inventors: Kenneth Algiene, Littleton, CO (US); Henry M. Abelman, Roswell, GA (US); Joseph Cachey, III, Denver, CO (US)

(73) Assignee: The Western Union Company, Englewood, CO (US)

Reexamination Request:
No. 90/012,075, Dec. 30, 2011

Reexamination Certificate for:
Patent No.: 8,027,916
Issued: Sep. 27, 2011
Appl. No.: 10/322,311
Filed: Dec. 17, 2002

(51) Int. Cl.
*G06Q 40/00* (2006.01)

(52) U.S. Cl. .................................................. 705/39
(58) Field of Classification Search ............... None
See application file for complete search history.

(56) References Cited

To view the complete listing of prior art documents cited during the proceeding for Reexamination Control Number 90/012,075, please refer to the USPTO's public Patent Application Information Retrieval (PAIR) system under the Display References tab.

*Primary Examiner* — Simon Ke

(57) ABSTRACT

A system for screening money transfers. According to one embodiment of the invention an operator is provided with at least one prompt to request further information about an attempted money transfer. The operator can be prompted with a series of questions to facilitate a regimented screening process of suspicious transfers.

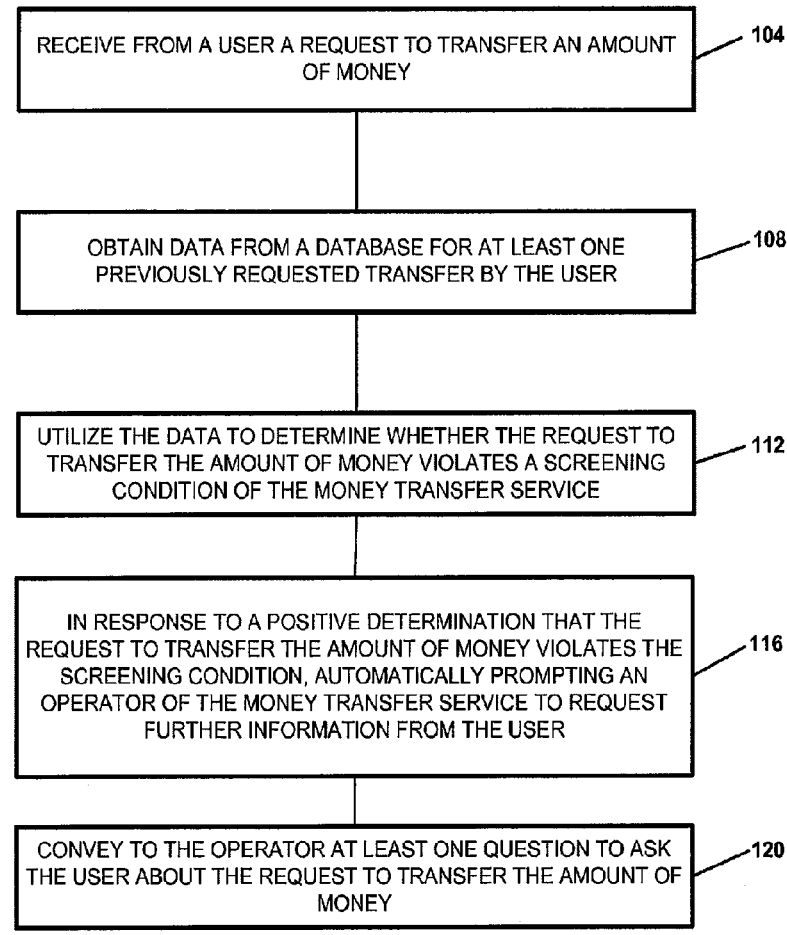

US 8,027,916 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 17 and 28 are cancelled.

Claims 1, 3-6, 9-15 and 18-21 are determined to be patentable as amended.

Claims 7, 8, 16, 22-27 and 29-31, dependent on an amended claim, are determined to be patentable.

New claims 32-65 are added and determined to be patentable.

1. A non-transitory computer-readable medium for monitoring an attempted money transfer through a money transfer service, having sets of instructions stored thereon which, when executed by a computer, cause the computer to:
   receive from a user a request to transfer an amount of money to a receiving party;
   obtain data from a database for at least one previously requested transfer by said user; [and]
   utilize said data to determine whether said request to transfer said amount of money violates a screening condition of said money transfer service, wherein said screening condition is capable of facilitating the detection of improper money transfers;
   *in response to a positive determination that said request to transfer said amount of money violates said screening condition, automatically prompt an operator of said money transfer service to request further information from said user; and*
   *convey to said operator at least one question to ask said user about said request to transfer said amount of money, wherein said conveying to said operator at least one question to ask said user comprises: requesting the purpose of the transfer.*

3. The non-transitory computer-readable medium as described in claim [2] *1* wherein said screening condition comprises assessing the frequency of attempted money transfers involving said user.

4. The non-transitory computer-readable medium as described in claim [2] *1* wherein said screening condition comprises assessing the amounts of attempted money transfers involving said user.

5. The non-transitory computer-readable medium as described in claim [2] *1* wherein said screening condition comprises assessing the frequency of attempted money transfers involving said user and assessing the amounts of attempted money transfers involving said user.

6. A non-transitory computer-readable medium for monitoring an attempted money transfer through a money transfer service, having sets of instructions stored thereon which, when executed by a computer, cause the computer to:
   receive from a user a request to transfer an amount of money to a receiving party;
   obtain data from a database for at least one previously requested transfer by said user;
   utilize said data to determine whether said request to transfer said amount of money violates a screening condition of said money transfer service, wherein said screening condition is capable of facilitating the detection of improper money transfers; [and]
   *in response to a positive determination that said request to transfer said amount of money violates said screening condition, prompt an operator of said money transfer service to request further information from said user; and*
   *convey to said operator at least one question to ask said user about said request to transfer said amount of money, wherein said conveying to said operator at least one question to ask said user comprises: requesting the purpose of the transfer; and*
   make an in-person inquiry with said user by said operator.

9. The non-transitory computer-readable medium as described in claim [2] *1* wherein said request to transfer money is made via the interact.

10. The non-transitory computer-readable medium as described in claim [2] *1* wherein said request to transfer money is submitted by said user at a money transfer service location.

11. The non-transitory computer-readable medium as described in claim [2] *1* wherein said request to transfer money is submitted by said user via a telephone.

12. The non-transitory computer-readable medium as described in claim [2] *1* wherein said conveying to said operator at least one question to ask said user comprises prompting said operator with said question on a display of the operator.

13. The non-transitory computer-readable medium as described in claim [2] *1* wherein said conveying to said operator at least one question to ask said user comprises prompting said operator to request supporting documentation indicating a legal purpose for the money transfer.

14. The non-transitory computer-readable medium as described in claim [2] *13*, wherein said supporting documentation comprises an invoice.

15. The non-transitory computer-readable medium as described in claim [2] *1* and further comprising:
   requesting further information from the receiving party for use in determining whether the money transfer is for a legal purpose.

18. The non-transitory computer-readable medium as described in claim [2] *1* wherein said conveying to said operator at least one question to ask said user comprises inquiring why said user is not using a bank to accomplish the money transfer.

19. The non-transitory computer-readable medium as described in claim [2] *1* wherein said conveying to said operator at least one question to ask said user comprises inquiring whether the user knows the receiving party.

20. The non-transitory computer-readable medium as described in claim [2] *1* and further comprising:
   determining a previous operator who checked on a previous transaction by said user;
   having the previous operator inquire with the user about the present attempted money transfer.

21. An article of manufacture comprising:
   a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user; *and* computer readable program code for causing said computer to effect conveying to said operator at least one question to ask said user about said request to transfer said amount of money, *wherein said computer readable program code for causing said computer to effect conveying to said operator said at least one question to ask said user about said request to transfer said amount of money comprises: computer readable program code for requesting the purpose of the transfer.*

32. The non-transitory computer-readable medium as described in claim 1, wherein the request is made in-person.

33. The non-transitory computer-readable medium as described in claim 32, wherein said in-person inquiry is via a telephone.

34. The non-transitory computer-readable medium as described in claim 32, wherein said in-person inquiry requires said user to be in the physical presence of said operator.

35. The non-transitory computer-readable medium as described in claim 6, wherein the screening condition comprises at least one of: assessing the frequency of attempted money transfers involving said user, assessing the amounts of attempted money transfers involving said user or assessing the frequency of attempted money transfers involving said user and assessing the amounts of attempted money transfers involving said user.

36. The non-transitory computer-readable medium as in claim 6, wherein the prompt requests the telephone operator to ask a question from the group consisting of: supporting documentation indicating a legal purpose for the money transfer, an invoice, further information from the receiving party for use in determining whether the money transfer is for a legal purpose, supporting documentation from the receiving party as to the purpose of the transfer, why said user is not using a bank to accomplish the money transfer, or whether the user knows the receiving party.

37. *A non-transitory computer-readable medium for monitoring an attempted money transfer through a money transfer service, having sets of instructions stored thereon which, when executed by a computer, cause the computer to:* receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompting an operator of said money transfer service to request further information from said user; and convey to said operator at least one question to ask said user about said request to transfer said amount of money, wherein said conveying to said operator at least one question to ask said user comprises prompting said operator to request supporting documentation indicating a legal purpose for the money transfer.

38. *A non-transitory computer-readable medium for monitoring an attempted money transfer through a money transfer service, having sets of instructions stored thereon which, when executed by a computer, cause the computer to:* receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompting an operator of said money transfer service to request further information from said user; and conveying to said operator at least one question to ask said user about said request to transfer said amount of money, wherein said conveying to said operator at least one question to ask said user comprises prompting said operator to request supporting documentation, and wherein said supporting documentation comprises an invoice.

39. *A non-transitory computer-readable medium for monitoring an attempted money transfer through a money transfer service, having sets of instructions stored thereon which, when executed by a computer, cause the computer to:* receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompting an operator of said money transfer service to request further information from said user;

conveying to said operator at least one question to ask said user about said request to transfer said amount of money; and requesting further information from the receiving party for use in determining whether the money transfer is for a legal purpose.

40. *A non-transitory computer-readable medium for monitoring an attempted money transfer through a money transfer service, having sets of instructions stored thereon which, when executed by a computer, cause the computer to:* receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompting an operator of said money transfer service to request further information from said user;

convey to said operator at least one question to ask said user about said request to transfer said amount of money; and request further information from the receiving party for use in determining whether the money transfer is for a legal purpose, wherein said requesting further information from the receiving party comprises: computer readable program code for prompting said operator to request supporting documentation indicating a legal purpose for the money transfer.

41. A non-transitory computer-readable medium for monitoring an attempted money transfer through a money transfer service, having sets of instructions stored thereon which, when executed by a computer, cause the computer to:

receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompt an operator of said money transfer service to request further information from said user; and convey to said operator at least one question to ask said user about said request to transfer said amount of money, wherein said conveying to said operator at least one question to ask said user comprises inquiring why said user is not using a bank to accomplish the money transfer.

42. A non-transitory computer-readable medium for monitoring an attempted money transfer through a money transfer service, having sets of instructions stored thereon which, when executed by a computer, cause the computer to:

receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompt an operator of said money transfer service to request further information from said user; and convey to said operator at least one question to ask said user about said request to transfer said amount of money, wherein said conveying to said operator at least one question to ask said user comprises inquiring whether the user knows the receiving party.

43. A non-transitory computer-readable medium for monitoring an attempted money transfer through a money transfer service, having sets of instructions stored thereon which, when executed by a computer, cause the computer to:

receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, automatically prompt an operator of said money transfer service to request further information from said user;

convey to said operator at least one question to ask said user about said request to transfer said amount of money;

determine a previous operator who checked on a previous transaction by said user; and have the previous operator inquire with the user about the present attempted money transfer.

44. A non-transitory computer-readable medium for monitoring an attempted money transfer through a money transfer service, having sets of instructions stored thereon which, when executed by a computer, cause the computer to:

receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, prompt an operator of said money transfer service to request further information from said user by requesting that the user call a telephone operator in order to complete the transfer of said amount of money.

45. A non-transitory computer-readable medium as described in claim 44, further comprising receiving a telephone call from the user at a service call center location to provide the further information.

46. A non-transitory computer-readable medium as described in claim 45, wherein the further information requested from the user is selected from a group consisting of: supporting documentation indicating a legal purpose for the money transfer, an invoice, further information from the receiving party for use in determining whether the money transfer is for a legal purpose, supporting documentation from the receiving party as to the purpose of the transfer, why said user is not using a bank to accomplish the money transfer, or whether the user knows the receiving party.

47. An article of manufacture comprising:

a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user;

computer readable program code for causing said computer to effect conveying to said operator at least one question to ask said user about said request to transfer said amount of money; and computer readable program code for requesting further information from the receiving party for use in determining whether the money transfer is for a legal purpose.

48. An article of manufacture comprising:

a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user;

computer readable program code for causing said computer to effect conveying to said operator at least one question to ask said user about said request to transfer said amount of money; and computer readable program code for requesting further information from the receiving party for use in determining whether the money transfer is for a legal purpose, wherein said computer readable program code for requesting further information from the receiving party comprises: computer readable program code for requesting supporting documentation from the receiving party.

49. An article of manufacture comprising:

a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user; and computer readable program code for causing said computer to effect conveying to said operator at least one question to ask said user about said request to transfer said amount of money, wherein said computer readable program code for causing said computer to effect conveying to said operator said at least one question to ask said user about said request to transfer said amount of money comprises: computer readable program code for requesting the purpose of the transfer.

50. An article of manufacture comprising:

a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user; and computer readable program code for causing said computer to effect conveying to said operator at least one question to ask said user about said request to transfer said amount of money, wherein said computer readable program code for causing said computer to effect conveying to said operator said at least one question to ask said user about said request to transfer said amount of money comprises: computer readable program code for inquiring why said user is not using a bank to accomplish the money transfer.

51. An article of manufacture comprising:

a computer usable medium having computer readable program code embodied therein for causing a computer to monitor an attempted money transfer by a user, the computer readable program code in said article of manufacture comprising:

computer readable program code for causing said computer to effect obtaining data from a database for at least one previously requested transfer by said user;

computer readable program code for causing said computer to effect utilizing said data to determine whether said request to transfer said amount of money violates a screening condition of said money transfer service, wherein said screening condition is capable of facilitating the detection of improper money transfers;

computer readable program code for causing said computer to effect, in response to a positive determination that said request to transfer said amount of money violates said screening condition, automatically prompting an operator of said money transfer service to request further information from said user; and computer readable program code for causing said computer to effect conveying to said operator at least one question to ask said user about said request to transfer said amount of money, wherein said computer readable program code for causing said computer to effect conveying to said operator said at least one question to ask said user about said request to transfer said amount of money comprises: computer readable program code for inquiring whether the user knows the receiving party.

52. An article of manufacture comprising:
a computer usable medium having computer readable program code embodied therein for causing a computer to monitor an attempted money transfer by a user, the computer readable program code in said article of manufacture comprising:
computer readable program code for causing said computer to effect obtaining data from a database for at least one previously requested transfer by said user;
computer readable program code for causing said computer to effect utilizing said data to determine whether said request to transfer said amount of money violates a screening condition of said money transfer service, wherein said screening condition is capable of facilitating the detection of improper money transfers;
computer readable program code for causing said computer to effect, in response to a positive determination that said request to transfer said amount of money violates said screening condition, automatically prompting an operator of said money transfer service to request further information from said user;
computer readable program code for causing said computer to effect conveying to said operator at least one question to ask said user about said request to transfer said amount of money;
computer readable program code for determining a previous operator who checked on a previous transaction by said user; and
computer readable program code for having the previous operator inquire with the user about the present attempted money transfer.

53. A non-transitory computer-readable medium for monitoring an attempted money transfer through a money transfer service, having sets of instructions stored thereon which, when executed by a computer, cause the computer to:
receive from a user a request to transfer an amount of money to a receiving party, wherein the request is received from a user computer interacting with a web site operating on a computer network;
obtain data from a database for at least one previously requested transfer by said user;
utilize said data to determine whether said request to transfer said amount of money violates a screening condition of said money transfer service, wherein said screening condition is capable of facilitating the detection of improper money transfers;
in response to a positive determination that said request to transfer said amount of money violates said screening condition, prompt a human operator of said money transfer service to request further information from said user.

54. The non-transitory computer-readable medium as described in claims 53, wherein the network comprises the Internet.

55. A non-transitory computer-readable medium for monitoring an attempted money transfer through a money transfer service, having sets of instructions stored thereon which, when executed by a computer, cause the computer to:
receive from a user a request to transfer an amount of money to a receiving party;
obtain data from a database for at least one previously requested transfer by said user;
utilize said data to determine whether said request to transfer said amount of money violates a screening condition of said money transfer service, wherein said screening condition is capable of facilitating the detection of improper money transfers;
in response to a positive determination that said request to transfer said amount of money violates said screening condition, transmit a prompt to a separate service call center to permit a telephone operator to request further information regarding the transfer.

56. The non-transitory computer-readable medium as in claim 55, wherein the prompt requests the telephone operator to call the user or requests the receiver to provide the further information.

57. The non-transitory computer-readable medium as in claim 55, wherein the screening condition comprises at least one of: assessing the frequency of attempted money transfers involving said user, assessing the amounts of attempted money transfers involving said user or assessing the frequency of attempted money transfers involving said user and assessing the amounts of attempted money transfers involving said user.

58. The non-transitory computer-readable medium as in claim 55, wherein the prompt requests the telephone operator to ask a question from the group consisting of: supporting documentation indicating a legal purpose for the money transfer, an invoice, further information from the receiving party for use in determining whether the money transfer is for a legal purpose, supporting documentation from the receiving party as to the purpose of the transfer, why said user is not using a bank to accomplish the money transfer, or whether the user knows the receiving party.

59. The non-transitory computer-readable medium as in claim 55, wherein the separate service call center comprises a remote service call center.

60. A non-transitory computer-readable medium for monitoring an attempted money transfer through a money transfer service, having sets of instructions stored thereon which, when executed by a computer, cause the computer to:
receive from a user a request to transfer an amount of money to a receiving party, wherein the request is received from a user computer interacting with a web site operating on a computer network;
obtain data from a database for at least one previously requested transfer by said user;
utilize said data to determine whether said request to transfer said amount of money violates a screening condition of said money transfer service, wherein said screening condition is capable of facilitating the detection of improper money transfers;
in response to a positive determination that said request to transfer said amount of money violates said screening condition, transmit a request that the user provide additional information needed to complete the request, wherein said conveying to said operator at least one question to ask said user comprises: requesting the purpose of the transfer.

61. The non-transitory computer-readable medium as described in claim 60, wherein the request is that the user contact an operator by telephoning the operator.

62. The non-transitory computer-readable medium as described in claim 60, wherein the network comprises the Internet.

63. The non-transitory computer-readable medium as described claim 60, wherein the screening condition comprises at least one of: assessing the frequency of attempted money transfers involving said user, assessing the amounts of attempted money transfers involving said user or assessing the frequency of attempted money transfers involving said user and assessing the amounts of attempted money transfers involving said user.

64. The non-transitory computer-readable medium as in claim 60, wherein the further information requested from the user is selected from a group consisting of: supporting documentation indicating a legal purpose for the money transfer, an invoice, further information from the receiving party for use in determining whether the money transfer is for a legal purpose, supporting documentation from the receiving party as to the purpose of the transfer, why said user is not using a bank to accomplish the money transfer, or whether the user knows the receiving party.

65. A non-transitory computer-readable medium for monitoring an attempted money transfer through a money transfer service, having sets of instructions stored thereon which, when executed by a computer, cause the computer to:

receive from a user a request to transfer an amount of money to a receiving party;

obtain data from a database for at least one previously requested transfer by said user;

utilize said data to determine whether said request to transfer said amount of money violates a screening condition of said money transfer service, wherein said screening condition is capable of facilitating the detection of improper money transfers;

in response to a positive determination that said request to transfer said amount of money violates said screening condition, prompt an operator of said money transfer service to request further information from said user; and convey to said operator at least one question to ask said user about said request to transfer said amount of money, wherein said conveying to said operator at least one question to ask said user comprises: requesting the purpose of the transfer.

\* \* \* \* \*